(12) United States Patent
Shaarawi et al.

(10) Patent No.: US 11,318,669 B2
(45) Date of Patent: May 3, 2022

(54) THREE-DIMENSIONAL (3D) PRINTING (71) Applicant: Hewlett-Packard Development Company, L.P., Houston, TX (US)

(72) Inventors: Mohammed S. Shaarawi, Corvallis, OR (US); Vladek Kasperchik, Corvallis, OR (US); James McKinnell, Corvallis, OR (US); David A. Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 426 days.

(21) Appl. No.: 15/763,172

(22) PCT Filed: Jan. 29, 2016

(86) PCT No.: PCT/US2016/015704
§ 371 (c)(1),
(2) Date: Mar. 26, 2018

(87) PCT Pub. No.: WO2017/131757
PCT Pub. Date: Aug. 3, 2017

(65) Prior Publication Data
US 2018/0272600 A1  Sep. 27, 2018

(51) Int. Cl.
*B29C 64/165* (2017.01)
*B33Y 70/00* (2020.01)
(Continued)

(52) U.S. Cl.
CPC ............ *B29C 64/165* (2017.08); *B22F 10/10* (2021.01); *B28B 1/001* (2013.01); *B29C 64/20* (2017.08);
(Continued)

(58) Field of Classification Search
CPC ........................... B29C 64/165; B29C 64/393
See application file for complete search history.

(56) References Cited

U.S. PATENT DOCUMENTS 3,779,807 A * 12/1973 Taylor ..................... C23D 5/02
427/58
4,627,160 A * 12/1986 Herron .................. C04B 35/638
156/89.18
(Continued)

FOREIGN PATENT DOCUMENTS

| CN | 104759623 | 7/2015 |
| CN | 104837920 | 8/2015 |

(Continued)

*Primary Examiner* — Nicholas R Krasnow
(74) *Attorney, Agent, or Firm* — Dierker & Kavanaugh PC (57) ABSTRACT

In a three-dimensional printing method example, a liquid functional agent is selectively applied. The liquid functional agent includes i) an energy source material or ii) an energy sink material. A metallic or ceramic build material is applied. The liquid functional agent is selectively applied any of before the metallic or ceramic build material, after the metallic or ceramic build material, or both before and after the metallic or ceramic build material. The liquid functional agent patterns the metallic or ceramic build material to form a composite layer. At least some of the metallic or ceramic build material is exposed to energy. A reaction involving i) the energy source material or ii) the energy sink material is initiated to alter a thermal condition of the composite layer.

14 Claims, 3 Drawing Sheets

(51) Int. Cl.

| | | |
|---|---|---|
| *B33Y 10/00* | (2015.01) | |
| *B33Y 30/00* | (2015.01) | |
| *B28B 1/00* | (2006.01) | |
| *C04B 35/111* | (2006.01) | |
| *C04B 35/46* | (2006.01) | |
| *C04B 35/486* | (2006.01) | |
| *C04B 35/491* | (2006.01) | |
| *C04B 35/447* | (2006.01) | |
| *C04B 35/26* | (2006.01) | |
| *C04B 35/56* | (2006.01) | |
| *C04B 35/14* | (2006.01) | |
| *C04B 35/468* | (2006.01) | |
| *C04B 35/636* | (2006.01) | |
| *C04B 35/565* | (2006.01) | |
| *C04B 35/632* | (2006.01) | |
| *C04B 35/584* | (2006.01) | |
| *B22F 10/10* | (2021.01) | |
| *B33Y 50/02* | (2015.01) | |
| *B29C 64/20* | (2017.01) | |
| *B29C 64/393* | (2017.01) | |
| *B29K 505/00* | (2006.01) | |
| *B29K 509/02* | (2006.01) | |

(52) U.S. Cl.
CPC ............ *B29C 64/393* (2017.08); *B33Y 10/00* (2014.12); *B33Y 30/00* (2014.12); *B33Y 50/02* (2014.12); *B33Y 70/00* (2014.12); *C04B 35/111* (2013.01); *C04B 35/14* (2013.01); *C04B 35/26* (2013.01); *C04B 35/447* (2013.01); *C04B 35/46* (2013.01); *C04B 35/4682* (2013.01); *C04B 35/486* (2013.01); *C04B 35/491* (2013.01); *C04B 35/565* (2013.01); *C04B 35/5626* (2013.01); *C04B 35/584* (2013.01); *C04B 35/632* (2013.01); *C04B 35/636* (2013.01); *B29K 2505/00* (2013.01); *B29K 2509/02* (2013.01); *C04B 2235/6026* (2013.01)

(56) References Cited

U.S. PATENT DOCUMENTS

| | | | |
|---|---|---|---|
| 6,180,049 | B1 | 1/2001 | Jang et al. |
| 6,183,871 | B1* | 2/2001 | Lee .................... C03C 8/14 |
| | | | 313/364 |
| 8,509,933 | B2 | 8/2013 | Steingart et al. |
| 2004/0148868 | A1 | 8/2004 | Anderson et al. |
| 2005/0093208 | A1 | 5/2005 | Boyd et al. |
| 2007/0238056 | A1 | 10/2007 | Baumann et al. |
| 2007/0241482 | A1 | 10/2007 | Giller et al. |
| 2009/0117435 | A1* | 5/2009 | Du ........................ H01M 8/10 |
| | | | 429/443 |
| 2010/0230871 | A1* | 9/2010 | Wright .................. C04B 35/111 |
| | | | 264/666 |
| 2015/0014881 | A1* | 1/2015 | Elsey ..................... B33Y 30/00 |
| | | | 264/219 |
| 2015/0099102 | A1* | 4/2015 | Sullivan ................ C09D 11/02 |
| | | | 428/206 |
| 2016/0254072 | A1* | 9/2016 | Park ........................ H01B 1/18 |
| | | | 252/503 |
| 2016/0271878 | A1* | 9/2016 | Nuechterlein ......... C22C 1/0491 |
| 2016/0305256 | A1* | 10/2016 | Knittel ..................... B22F 3/23 |
| 2017/0021526 | A1* | 1/2017 | Joshi ..................... C04B 35/651 |
| 2018/0161874 | A1* | 6/2018 | Nuechterlein .......... C22C 27/04 |
| 2019/0055171 | A1* | 2/2019 | Straathof ............ C06B 21/0083 |

FOREIGN PATENT DOCUMENTS

| | | |
|---|---|---|
| CN | 104859277 | 8/2015 |
| CN | 105189405 | 12/2015 |
| EP | 0431924 A2 | 6/1991 |
| EP | 1415792 A2 | 5/2004 |
| WO | WO-2015030879 | 3/2015 |
| WO | WO-2015-108543 | 7/2015 |

\* cited by examiner

THREE-DIMENSIONAL (3D) PRINTING

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional materials in three-dimensional (3D) printing. 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method and the 3D printing system disclosed herein utilize Selective Laser Melting (SLM), Selective Laser Sintering (SLS), or Multi Jet Fusion (MJF). During selective laser melting and selective laser sintering, a laser beam is aimed at a selected region (in some instances less than the entire layer) of a layer of a build material (also referred to as build material particles). Heat from the laser beam causes the build material under the laser beam to melt (in selective laser melting) or sinter (in selective laser sintering). This causes the build material to fuse, bind, cure, etc. to form the layer of the 3D part. During multi jet fusion, an entire layer of a build material is exposed to radiation, but a selected region (in some instances less than the entire layer) of the build material is fused and hardened to become a layer of a 3D part.

Examples of the 3D printing method and 3D printing system disclosed herein utilize a liquid functional agent that contains an energy source material or an energy sink material dispersed in an aqueous or non-aqueous vehicle. The energy source material or the energy sink material of the liquid functional agent is capable of undergoing a reaction. When the liquid functional agent contains an energy source material, the reaction is an exothermic reaction that supplies additional heat to the build material. When the liquid functional agent contains an energy sink material, the reaction is an endothermic reaction that removes/consumes heat.

The liquid functional agent allows for control over the heating and cooling rates of the build material and therefore the kinetics and thermodynamics of phase transformations during the formation of a 3D printed part. Because the liquid functional agent may be jetted (using inkjet technology) onto the build material in discrete amounts (e.g., 1 ng to several hundred ng), control over phase nucleation and growth, morphology, microstructure, and grain size may be localized throughout the 3D printed part. Thus, physical properties of the 3D printed part, such as hardness, ultimate tensile strength, elastic modulus, electrical conductivity, and surface finish, may be customized on the voxel scale.

As used herein, the terms "3D printed part," "3D part," or "part" may be a completed 3D printed part or a layer of a 3D printed part.

Figure 1:
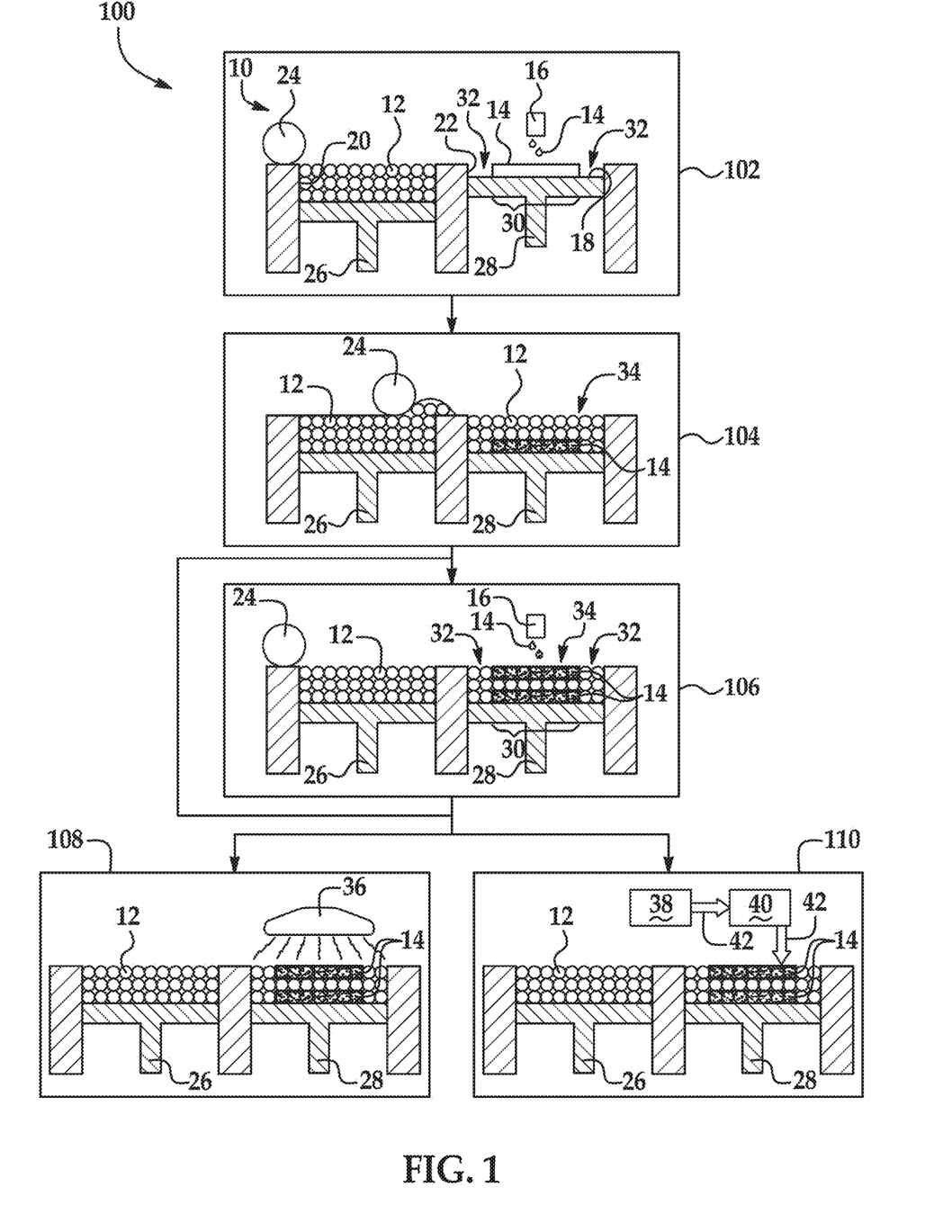
FIG. 1 is a flow diagram illustrating an example of a 3D printing method disclosed herein.

The 3D printing method shown in FIG. 1 utilizes the liquid functional agent 14 disclosed herein. In some examples, the liquid functional agent 14, which includes an energy source material or an energy sink material, does not include an energy absorber. In some of the examples disclosed herein, the energy source material or the energy sink material may absorb a sufficient amount of energy in order to initiate an exothermic or endothermic reaction. In other examples, the energy source material may absorb little or none of the energy, as the exothermic reaction may be initiated upon exposure to an oxidizer without any outside energy. When energy is absorbed to initiate the exothermic or endothermic reaction, the energy may be directly applied by an energy source, or it may be energy transferred from a build material which absorbs the energy applied by the energy source. As such, the energy source material and the energy sink material do not function as a typical energy absorber, which absorbs a significant amount of the applied energy and converts the applied energy to heat, which is then transferred to the surrounding build material. Rather, some examples of the energy source material absorb little to none of the applied energy, other examples of the energy source material absorb enough energy to initiate an exothermic reaction that produces additional energy, and examples of the energy sink material disclosed herein absorb enough energy to initiate an endothermic reaction that consumes energy from the system.

The liquid functional agent 14 is a liquid, and may be included in a single cartridge set or a multiple-cartridge set. In the multiple-cartridge set, any number of the multiple dispersions may have an energy source material or an energy sink material incorporated therein.

In one example, the liquid functional agent 14 disclosed herein includes a liquid vehicle, and the energy source material or the energy sink material. In some examples the liquid functional agent 14 consists of these components, with no other components. In still other examples, the liquid functional agent 14 may include the energy source material or the energy sink material, with no other components.

As used herein, "liquid vehicle," and "vehicle" may refer to the liquid fluid in which the energy source material or the energy sink material is placed to form the liquid functional agent(s) 14. A wide variety of vehicles may be used in the liquid functional agent 14 and methods of the present disclosure. The vehicle may include water alone, a master solvent alone, or water or a master solvent in combination with a mixture of a variety of additional components. Examples of these additional components may include organic co-solvent(s), surfactant(s), antimicrobial agent(s), anti-kogation agent(s) (for thermal inkjet formulations), and/or chelating agent(s). One example vehicle includes water, co-solvent(s), and surfactant(s). In any of the examples disclosed herein, the co-solvent(s) may be used to improve reliability, nozzle health, and decap performance (i.e., the ability of the fluid to readily eject from a printhead, upon prolonged exposure to air), and the surfactant(s) may be used to quickly wet the build material 12.

The water-based or master solvent-based vehicle may include an organic co-solvent present, in total in the liquid functional agent(s) 14, in an amount ranging from about 1 wt % to about 50 wt % (based on the total wt % of the liquid functional agent 14), depending, at least in part, on the jetting architecture. In an example, the co-solvent is present in the liquid functional agent 14 in an amount of about 10 wt % based on the total wt % of the liquid functional agent 14. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

It is to be understood that some of the high-boiling point solvents capable of oxidation may also function as energy source materials (e.g., when an oxidizer is present in the surrounding environment or introduced by jetting) or energy sink materials (e.g., in the absence of oxidizer). For example, in the presence of $O_2$ or $O_2$ precursors, many organic solvents suitable for inkjet formulations (and for the liquid functional agent 14 disclosed herein) can be oxidized to $CO_2$, $H_2O$ and, in some cases, $N_2$, with a significant amount of heat released. Some specific examples include 1-butanol ($\Delta Hc=-2670$ kJ/mol), 1,2-pentanediol ($\Delta Hc=-3135.8$ kJ/mol), 1,2-Hexanediol ($\Delta Hc=-3784.8$ kJ/mol); 2-pyrrolidone ($\Delta Hc=-2308.40$ kJ/mol); glycerol ($\Delta Hc=-1654.3$ kJ/mol); diethylene glycol ($\Delta Hc=-2374.7$ kJ/mol); tetraethylene glycol ($\Delta Hc=-4738.8$ kJ/mol); 1-hexanol ($\Delta Hc=-3978.1$ kJ/mol); sorbitol ($\Delta Hc=-3009.4$ kJ/mol), etc.

As mentioned above, the vehicle may also include surfactant(s). As an example, the liquid functional agent 14 may include non-ionic, cationic, and/or anionic surfactants, which may be present in an amount ranging from about 0.01 wt % to about 5 wt % based on the total wt % of the liquid functional agent 14. In at least some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the liquid functional agent 14 may include a total amount of antimicrobial agents that ranges from about 0.1 wt % to about 0.25 wt %.

When the liquid functional agent 14 is to be applied via thermal inkjet applications, an anti-kogation agent may also be included in the vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid functional agent 14 in an amount ranging from about 0.1 wt % to about 1 wt % of the total wt % of the liquid functional agent 14.

The vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the liquid functional agent 14 may range from 0 wt % to about 1 wt % based on the total wt % of the liquid functional agent 14.

The balance of the vehicle is water or a master solvent. As such, the amount of water or master solvent may vary depending upon the weight percent of the other liquid functional agent components.

In an example, the water is deionized water.

Examples of the master solvent may be water-soluble solvents or non-aqueous solvents, such as lower polarity solvents or non-polar solvents. Examples of water-soluble solvents with polar groups include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the master solvent may be 1-(2-hydroxyethyl)-2-pyrrolidone. In other cases, the master solvent may be based on lower polarity or non-polar solvents, both of which have poor water solubility. Examples of lower polarity or non-polar solvents include aliphatic, cyclic aliphatic or aromatic hydrocarbons. Water insoluble fatty alcohols, esters, ketones, ethers and other liquid (at ambient temperatures) oxidizable organic species are suitable candidates for non-aqueous formulations, especially for piezo applications. It is desirable that any of the master solvents disclosed herein have a boiling temperature that is higher than water.

The liquid functional agent 14 (shown in FIG. 1) also includes the energy source material or the energy sink material. The energy source material and the energy sink material are each capable of undergoing a reaction. When an energy source material is included in the liquid functional agent 14, the reaction is an exothermic reaction that supplies additional heat/energy to a composite layer 34 (i.e., a portion of the build material 12 patterned with the liquid functional agent 14). When an energy sink material is included in the liquid functional agent 14, the reaction is an endothermic reaction that consumes heat/energy from the composite layer 34.

In some of the examples disclosed herein, the energy sink material consumes heat not through chemical reaction but through phase change. Examples of these energy sink materials include polar organic solvents and other species (usually organic) with high boiling temperatures and considerable heat of vaporization, for example, glycerol ($T_{boil}$=560° K; $\Delta_{vap}H$=91.7 kJ/mol); 1,2-pentanediol ($T_{boil}$=480° K; $\Delta_{vap}H$=74.6 kJ/mol); sorbitol ($T_{boil}$=497° K; $\Delta_{vap}H$=132.4 kJ/mol); and urea ($T_{evaporation}$=368° K; $\Delta_{vap}H$=94.6 kJ/mol). Many of the organic species with significant negative oxidation enthalpy may act both as an energy source material in the presence of an oxidizer and also as an energy sink material in an absence of an oxidizing species. An example of a species with such behavior would be a majority of combustible high boiling organic solvents (fatty alcohols, diols, triols, etc.). On the other hand, some of the species with relatively low negative oxidation enthalpy can be confined to an energy sink role alone (such as urea, which is not combustible at ambient conditions).

By selectively applying the liquid functional agent 14 and selectively initiating exothermic and endothermic reactions, the heating and cooling rates of the build material 12 may be controlled. The cooling rate directly defines the phase and morphology of the resulting 3D printed part, which in turn defines the physical properties of the 3D part. For example, when steel 4340 heated to 725° C. or higher has a cooling rate of greater than 8.3° C./s, martensite is formed. When the cooling rate is less than 8.3° C./s and greater than 0.3° C./s, a combination of martensite and bainite is formed. At a cooling rate of less than 0.3° C./s and greater than 0.02° C./s, a combination of martensite, bainite, and ferrite is formed. At a cooling rate of less than 0.02° C./s and greater than 0.006° C./s, a combination of martensite, bainite, ferrite, and pearlite is formed, and at a cooling rate of less than 0.006° C./s, a combination of pearlite and ferrite is formed. Ferrite is soft and tough. Pearlite has a lamellar structure and is stronger and harder than ferrite. Bainite is generally harder and stronger than pearlite but still retains good toughness. Martensite is very hard and brittle. Thus, by controlling the cooling rates at different areas of the 3D part, different physical properties can be achieved at those different areas of the part. For example, the 3D part may have different levels of structural integrity at different areas based on the cooling rates of those areas, which may be controlled using examples of the liquid functional agent 14 disclosed herein.

The exothermic reaction involving the energy source material that supplies additional heat/energy to a composite layer 34 (i.e., a portion of the build material 12 patterned with the liquid functional agent 14) generates a gaseous byproduct. If the byproduct of the exothermic reaction is not a gas, the byproduct may contaminate the build material 12 and the resulting 3D printed part may be contaminated with a solid residue. The energy source material may be a reactant including a fuel and an oxidizer, or a reactant fuel.

When the energy source material is the reactant including both the fuel and oxidizer, some oxidizable parts of the reactant molecule structure act as a fuel while other parts of the reactant molecule structure act as oxidizer. In these examples, the exothermic reaction may be initiated by exposing the composite layer 34 to energy. Examples of this type of reactant (including the fuel and oxidizer) include organic molecules with nitro ($NO_2$) groups such as picric acid and its esters, dinitrotoluene, trinitrotoluene, cyclotrimethylenetrinitroamine, nitroguanidine, triaminodinitrobenzene, triaminodinitrobenzene, ethylenediamine dinitrate, ethylene dinitramine, etc. Further examples include organic esters of nitric acid, such as nitrocellulose, dinitroglycerol, and ethyleneglycol dinitrate; nitrates of mannitol of variable degrees of esterification; and nitrates of pentaerythritol. Still further examples include organic salts of nitric, chloric and perchloric acids, such as methylammonium nitrate.

When the energy source material is a reactant fuel, the exothermic reaction may be initiated by exposing the composite layer 34 to both an oxidizer and energy, or the exothermic reaction may be initiated by exposing the composite layer 34 to an oxidizer (i.e., no outside energy or ignition source is utilized). Examples of the reactant fuel, whose exothermic reaction may be initiated by exposure to both the oxidizer and energy, include oxidizable species with low vapor pressure at ambient conditions (e.g., vapor pressure less than that of water at ambient conditions). As used herein, ambient conditions refer to the air temperature of any environment where a human can function comfortably without means of protection, e.g., from about 18° C. to about 30° C. In an example, the reactant fuel produces oxidation products in the gas phase (e.g., water, carbon monoxide and dioxide, nitrogen, etc.) with very little or no oxidation products formed in the state of solid residue. Some examples include sugars and sugar alcohols such as sucrose, sorbitol, mannitol, glucose, fructose, etc. Still further examples include high boiling hydrocarbons (e.g., having a boiling point greater than the boiling point of water) of aliphatic and aromatic nature, such as diesel fuel, decalin, decalene, naphthalene, tetralin, and hydrocarbon waxes. Still further examples include high boiling alcohols (e.g., having a boiling point greater than the boiling point of water), such as glycerol, ethylene glycol, and diethylene glycol; organic amines of low volatility (e.g., slow evaporation at ambient conditions), such as hexamethylenetetramine; and dispersions of carbon particles, such as carbon black and graphite. Examples of the reactant fuel, whose exothermic reaction may be initiated by exposures to the oxidizer alone, include hydrazine, monomethylhydrazine, dimethylhydrazine, aniline, furfuryl alcohol, turpentine, tetramethylethylenediamine, and other easy to oxidize chemical species capable of spontaneous combustion (i.e., without external ignition) when in direct contact with aggressive oxidizing agents.

Examples of the oxidizer that may be used to initiate the reaction involving sugars, sugar alcohols, high boiling aliphatic hydrocarbons, high boiling aromatic hydrocarbons, high boiling alcohols, organic amines of low volatility, or dispersions of carbon particles may be introduced through the environment or by jetting. Examples of the oxidizer which may be introduced through the environment include oxygen gas and nitrous oxide ($N_2O$) gas. Examples of the oxidizer which may be introduced by jetting onto the composite layer 34 include soluble chemical species capable of generating sufficient amounts of oxygen during their thermal decomposition, such as ammonium nitrate, ammonium perchlorate, potassium permanganate, potassium perchlorate, and aggressive oxidizing agents, such as red fuming nitric acid, high concentration hydrogen peroxide (e.g., greater than 30 wt % solution in water), and perchloric acid.

Examples of the oxidizer that may be used to initiate the reaction involving hydrazine, monomethylhydrazine, dimethylhydrazine, aniline, furfuryl alcohol, turpentine, or tetramethylethylenediamine, include ammonium nitrate, ammonium perchlorate, potassium permanganate, potassium perchlorate, red fuming nitric acid, high concentration hydrogen peroxide (e.g. greater than 30 wt % solution in water), perchloric acid, nitrogen tetroxide (NTO), and nitric acid. Any of the liquids or solid state oxidizers that can be incorporated into a liquid, including ammonium nitrate, ammonium perchlorate, potassium permanganate, potassium perchlorate, red fuming nitric acid, high concentration hydrogen peroxide, nitrogen tetroxide (NTO), nitric acid, and perchloric acid, may be applied by jetting onto the composite layer 34.

The additional heat supplied by the exothermic reaction of the energy source material may super heat areas of the build material 12 to a temperature far above its melting temperature. This will cause the super heated portions of the build material 12 to cool at a different rate than the build material 12 that was not super heated. Thus, the super heated areas will have a different microstructure, and therefore, different physical properties, than the areas that were not super heated. Additionally, the additional heat supplied by the exothermic reaction may contribute to the fusing of the build material 12 during the 3D printing process. This additional heat may allow for the use of an energy source (during the 3D printing process) with reduced power (as compared to the power that would be needed to fuse the build material 12 without the aid of the reaction involving the energy source material). This additional heat may also allow the temperature supplied by the energy source to be reduced (as compared to the temperature that would be supplied by the energy source when the reaction involving the energy source material is not utilized). In this example, the energy source may heat the build material 12 to a temperature that is below the melting point of the build material 12, and the additional heat supplied by the exothermic reaction may bring the build material 12 to its melting point. This additional heat may further allow the build material 12 to fuse or melt in a shorter amount of time (as compared to the amount of time that would be required to fuse the build material 12 without the aid of the reaction involving the energy source material).

The energy source material may be present in the liquid functional agent 14 in an amount ranging from greater than 0 wt % to about 100 wt % of a total weight percent of the liquid functional agent 14. For example, a piezoelectric printhead may jet a liquid functional material 14 including 100 wt. % of a hydrocarbon fluid that is used the reactant fuel. It is believed that the energy source material loadings may be selected to provide a balance between the liquid functional agent 14 having jetting reliability and heat supply efficiency. Additionally, the energy source material selected and the amount of the energy source material to be incorporated into the liquid functional agent 14 may be based on the amount of additional heat desired and the build material 12 to which the heat is to be supplied.

The endothermic reaction involving the energy sink material that consumes heat/energy from the composite layer 34 (i.e., a portion of the build material 12 patterned with the liquid functional agent 14) may generate a gaseous byproduct. The energy sink material may be a thermally decomposing reactant. Some examples of the thermally decomposing reactant thermally decompose to a gas and vapor phase. Other examples of the thermally decomposing reactant thermally decompose to smaller, volatile fragments going into vapor phase and a gas. The volatile fragments may evaporate or sublimate from the build material 12. If the byproduct of the endothermic reaction is not a gas or a volatile fragment, the byproduct may contaminate the build material 12 and the resulting 3D printed part may be contaminated with a solid residue.

An example of the thermally decomposing reactant includes urea. Urea thermal decomposition produces ammonia and isocyanuric acid:

$$NH_2CONH_2 \rightarrow NH_4NCO \rightarrow HNCO + NH_3$$

Both of the final products components are in the gas phase at the decomposition temperature. Prior to its decomposition, urea melts, and this process also absorbs noticeable amount of heat (~14.5 kJ/mol at 409° K).

The endothermic reaction of the energy sink material may also be a physical reaction in which the energy sink material phase changes from a liquid to a gas or a solid to a gas. Examples of the energy sink material that undergo a phase change include glycerol, ethylene glycol, 2-methyl-1,3-propanediol, 1,2-pentanediol, sorbitol, and urea (described above). When glycerol and ethylene glycol are used as the energy sink material, the reaction must take place in the absence of the oxidizer so that they evaporate to consume energy rather than undergoing an oxidation reaction which would supply additional energy.

The removal of heat by the endothermic reaction of the energy sink material may speed up the cooling rate of the build material 12. Speeding up the cooling rate will cause the areas of the 3D part in contact with the energy sink material to have a different microstructure, and therefore, different physical properties, than those areas not in contact with the energy sink material. Additionally, the removal of heat by the endothermic reaction may prevent the build martial 12 from getting too hot. For example, the removal of heat by the reaction involving the energy sink material may prevent the build material 12 from reaching a temperature that is 50° C. degrees above its melting temperature. The removal of heat may also allow the build material 12 to fuse rather than melt. For example, the removal of excess heat may allow the build material 12 to heat to a temperature that is below its melting point but suitable to cause softening and bonding (e.g., fusing). The use of the liquid functional agent 14 including the energy sink material to remove heat may also prevent, or reduce the effects of thermal bleed. For example, the liquid functional agent 14 containing the energy sink material may be applied on areas of the build material 12 that are not to be fused/melted, so that heat supplied to those areas through thermal bleed will be removed by the endothermic reaction. The liquid functional agent 14 including the energy sink material may also be used to prevent areas of the build material from fusing/melting. For example, the liquid functional agent 14 including the energy sink material may be applied to a perimeter and/or at areas of the build material 12 where holes, slots, or other apertures are to be defined in the 3D object. When all of the build material 12 is heated to a suitable fusing/melting temperature, the endothermic reaction of the energy sink material will keep the build material 12 in contact therewith from reaching that temperature, and thus will prevent fusing/melting.

The energy sink material may be present in the liquid functional agent 14 in an amount ranging from greater than 0 wt % to about 100 wt % of a total weight percent of the liquid functional agent 14. For example, a liquid functional material 14 may include 100 wt. % of glycerol in the absence of oxidizers. It is believed that the energy sink material loadings may be selected to provide a balance between the liquid functional agent 14 having jetting reliability and heat removal efficiency. Additionally, the energy sink material selected and the amount of the energy sink material to be incorporated into the liquid functional agent 14 may be based on the amount of heat to be removed and the build material 12 from which the heat is to be removed.

Any of the heat source materials or heat sink materials that are soluble in the selected vehicle (when a vehicle is used) do not require a dispersing agent.

Any of the heat source materials or heat sink materials that are present in the liquid functional agent 14 as solid particles (e.g., carbon black) may include a dispersing species/agent. Examples of suitable dispersing species may be polymer or small molecule dispersants, charged groups attached to the particle surface, or other suitable dispersants. The dispersing agent helps to uniformly distribute the heat source material or the heat sink material throughout the liquid functional agent 14. Some examples of suitable dispersing agents include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins. When utilized, the dispersing agent may be present in an amount ranging from about 0.1 wt % to about 20 wt % of the total wt % of the heat source material or the heat sink material.

In examples of the 3D printing method disclosed herein, it is to be understood that one liquid functional agent 14 may be used to alter a thermal condition of the composite layer 34. It is also to be understood that multiple liquid functional agents 14 may be mixed at the same area of build material 12 to alter a thermal condition of the composite layer 34, or multiple liquid functional agents 14 may be applied to different areas of build material 12 (thus forming different composite layers 34) in order to alter a combination of thermal conditions of the composite layers 34.

An example of the 3D printing method 100 is depicted in FIG. 1. As an example, the method 100 may be used to control the physical properties of a 3D part on the voxel level.

Several variations of the method may take place. Generally, the liquid functional material 14 and the build material 12 are applied, where the liquid functional material 14 may be applied before the application of the build material 12, after the application of the build material 12, or both before and after the application of the build material 12. Each of these scenarios is depicted in the method 100.

In one example of the method 100, the liquid functional agent 14 is applied below and on the build material 12 before the composite layer 34 is exposed to energy (e.g., reference numerals 102-106 and either 108 or 110). In another example, the liquid functional agent 14 is only applied below the build material 12 before the composite layer 34 is exposed to energy (e.g., reference numerals 102, 104 and either 108 or 110). In still another example, the liquid functional agent 14 is only applied on the build material 12 before the composite layer 34 is exposed to energy (e.g., reference numerals 104—without the liquid functional material 14—and 106 and either 108 or 110).

While not shown, some examples of the method 100 include the application of a second liquid functional agent including an oxidizer to the composite layer 34. Additionally, in some examples of the method 100, the composite layer 34 is exposed to energy by using a spatially broad source 36 of energy (e.g., reference numeral 108), and in other examples of the method 100, the composite layer 34 is exposed to energy by using a tightly focused source 38 of energy. Each of these examples of the method 100 will be described in more detail below.

As shown in FIG. 1 at reference numeral 102, one example of the method 100 includes selective applying the liquid functional agent 14, which includes the energy source material or the energy sink material, before the build material 12 is applied. In the example illustrated at reference numeral 102, the liquid functional agent 14 is selectively applied to a build surface 18 before any build material 12 is applied thereto. In other examples (not shown), the liquid functional agent 14 is selectively applied below the build material 12 by selectively applying liquid functional agent 14 to a previously formed layer (e.g., a previously solidified layer of the 3D object). When the liquid functional agent 14 is applied, it forms a patterned area on the build surface 18 or on the previously formed layer. As shown at reference numeral 102, the build surface 18 may be the contact surface of a fabrication bed 22.

When the liquid functional agent 14 is applied before the build material 12, it is to be understood that the liquid functional agent 14 may penetrate into the subsequently applied layer of build material 12. The liquid functional agent 14 may completely saturate the subsequently applied layer of build material 12 or may partially penetrate the subsequently applied layer of build material 12. The level of saturation/penetration may depend, at least in part, on the layer thickness, the particle size of the build material 12 particles, and the volume of the liquid functional agent 14 that is applied.

In the example shown at reference numeral 102, applying the liquid functional agent 14 includes the use of the 3D printing system 10. The 3D printing system 10 may include an inkjet applicator 16, a supply bed 20 (including a supply of the build material 12), a delivery piston 26, a spreader 24 (an example of which is the roller shown in FIG. 1), a fabrication bed 22 (having the build surface 18), and a fabrication piston 28. Each of these physical elements may be operatively connected to a central processing unit (i.e., controller, not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part (not shown). The data for the selective delivery of the liquid functional agent 14, the build material 12, etc. may be derived from a model of the 3D part to be formed. For example, the instructions may cause the controller to utilize an applicator (e.g., an inkjet applicator 16) to selectively dispense the liquid functional agent 14, and to utilize a build material distributor to dispense the build material 12. Each of the components of the 3D printing system 10 will be described in more detail throughout the description of the method 100.

The liquid functional agent 14 may be dispensed from any suitable applicator. As illustrated in FIG. 1 at reference number 102, the liquid functional agent 14 may be dispensed from an inkjet printhead 16, such as a thermal inkjet printhead or a piezoelectric inkjet printhead. The printhead 16 may be a drop-on-demand printhead or a continuous drop printhead. The inkjet printhead(s) 16 selectively applies the liquid functional agent 14 on those portions 30 of the build surface 18 or the previously formed layer upon which the composite layer 34 is to be formed. The liquid functional agent 14 is not applied on the portions 32. As such, build material 12 that is applied on those portions 32 of the build surface 18 or the previously formed layer will not be patterned by the applied liquid functional agent 14.

In the example shown at reference numeral 102 in FIG. 1, the liquid functional agent 14 is deposited on less than all of the build surface 18. In other examples (not shown), the liquid functional agent 14 is deposited in different patterns than the one shown in FIG. 1 on less than all of the build surface 18 or on less than all of the previously formed layer. In still other examples (not shown), the liquid functional agent 14 is deposited on all of the build surface 18 or on all of the previously formed layer.

The printhead 16 may be selected to deliver drops of the liquid functional agent 14 at a resolution ranging from about 300 dots per inch (DPI) to about 1200 DPI. In other examples, the printhead 16 may be selected to be able to deliver drops of the liquid functional agent 14 at a higher or lower resolution. The drop velocity may range from about 5 m/s to about 24 m/s and the firing frequency may range from about 1 kHz to about 100 kHz. The printhead 16 may include an array of nozzles through which it is able to selectively eject drops of fluid. In one example, each drop may be in the order of about 5 ng per drop, although it is contemplated that a higher (e.g., 100 ng) or lower (e.g., 1 ng) drop size may be used. In some examples, printhead 16 is able to deliver variable size drops of the liquid functional agent 14.

The inkjet printhead(s) 16 may be attached to a moving XY stage or a translational carriage (neither of which is shown) that moves the inkjet printhead(s) 16 adjacent to the build surface 18 in order to deposit the liquid functional agent 14 in desirable area(s) 30. In other examples, the printhead(s) 16 may be fixed while a support member (supporting the build surface 18) is configured to move relative thereto.

In an example, the printhead(s) 16 may have a length that enables it to span the whole width of the build surface 18 in a page-wide array configuration. As used herein, the term 'width' generally denotes the shortest dimension in the plane parallel to the X and Y axes of the build surface 18, and the term 'length' denotes the longest dimension in this plane. However, it is to be understood that in other examples the term 'width' may be interchangeable with the term 'length'. In an example, the page-wide array configuration is achieved through a suitable arrangement of multiple printheads 16. In another example, the page-wide array configuration is achieved through a single printhead 16. In this other example, the single printhead 16 may include an array of nozzles having a length to enable them to span the width of the build surface 18. This configuration may be desirable for single pass printing. In still other examples, the printhead(s) 16 may have a shorter length that does not enable them to span the whole width of the build surface 18. In these other examples, the printhead(s) 16 may be movable bi-directionally across the width of the build surface 18. This configuration enables selective delivery of the liquid functional agent 14 across the whole width and length of the build surface 18 using multiple passes.

The inkjet printhead(s) 16 may be programmed to receive commands from a central processing unit and to deposit the liquid functional agent 14 according to a pattern of thermal condition(s) of the composite layer 34 to be achieved. In an example, a computer model of the part to be printed is generated using a computer aided design (CAD) program. The computer model of the 3D part is sliced into N layers, which are then divided into voxels. The printing parameters for each voxel are computed based on the desired physical properties of the part to be printed. The printing parameters for each voxel may include the X, Y, and Z coordinates that define its location and the amounts of which liquid functional agents 14 (if any) that are to be received. The central processing unit may then use this information to instruct the inkjet printhead(s) 16 as to how much (if any) of each liquid functional agent 14 should be jetted into each voxel.

After the liquid functional agent 14 is selectively applied in a pattern on the desired portion(s) 30 of the build surface 18 or the previously formed layer, a build material 12 is applied to the build surface 18 or the previously formed layer. When the liquid functional agent 14 is applied to the build surface 18 or the previously formed layer prior to the build material 12 being applied to the build surface 18 or the previously formed layer, the build material 12 and the liquid functional agent 14 combine to form the composite layer 34, as shown at reference numeral 104.

In another example of the 3D printing method 100, the build material 12 may be applied to the build surface 18 or the previously formed layer without the liquid functional agent 14 having been applied to the build surface 18 or the previously formed layer first. In this example, the method 100 begins at step 104, and while the liquid functional agent 14 is shown at the bottom of the build material 12 at reference numerals 104-110, it would not be present. Additionally, in this example of the method 100, the build material 12 does not form the composite layer 34 with the liquid functional agent 14 until the liquid functional agent 14 is applied at reference numeral 106.

The build material 12 may be a metallic material or a ceramic material. In an example, the build material 12 may be a powder.

Some examples of metallic build material 12 include steels, stainless steel, titanium (Ti) and alloys thereof, nickel cobalt (NiCo) alloys, gold (Au) and alloys thereof, silver (Ag) and alloys thereof, and copper (Cu) and alloys thereof. Some specific examples include AlSi10Mg, CoCr MP1, CoCr SP2, MaragingSteel MS1, NickelAlloy HX, Inconel IN625, Inconel IN718, SS GP1, SS PH1, SS 316L, Ti6Al4V, and Ti-6Al-4V ELI7.

Examples of the ceramic build material 12 include metal oxides, inorganic glasses, carbides, nitrides, borides, or combinations thereof. Some specific examples include alumina ($Al_2O_3$), $Na_2O/CaO/SiO_2$ glass (soda-lime glass), silicon carbide (SiC), silicon nitride ($Si_3N_4$), silicon dioxide ($SiO_2$), zirconia ($ZrO_2$), titanium dioxide ($TiO_2$), iron oxide ($Fe_3O_4$), hafnia ($HfO_2$), barium titanate ($BaTiO_3$), tungsten carbide (WC), lead zirconate titanate (PZT), Hydroxyapatite, or combinations thereof. As an example of one suitable combination, 30 wt % glass may be mixed with 70 wt % alumina.

The build material 12 may have a melting point ranging from about 100° C. to about 3500° C. As examples, the build material 12 may be metal having a melting point ranging from about 100° C. to about 3500° C., or a metal oxide having a melting point ranging from about 1000° C. to about 2800° C.

The build material 12 may be made up of similarly sized particles or differently sized particles. In the examples shown herein, the build material 12 includes similarly sized particles. The term "size", as used herein with regard to the build material 12, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the build material 12 may be greater than 1 µm and may be up to about 500 µm. Substantially spherical particles of this particle size have good flowability and can be spread relatively easily. As another example, the average size of the particles of the build material 12 ranges from about 10 µm to about 200 µm. As still another example, the average size of the particles of the build material 12 ranges from 20 µm to about 60 µm. In an example, the particle size of the ceramic build material particles 12 is greater than or equal to 10 µm for materials with a bulk density of greater than or equal to 3. For lower density ceramic build material particles, the particle size can be much larger.

As mentioned above, the 3D printing system 10 may include the supply bed 20, the delivery piston 26, the spreader 24, the fabrication bed 22, and the fabrication piston 28. The delivery piston 26 and the fabrication piston 28 may be the same type of piston, but are programmed to move in opposite directions. In an example, when a layer of the 3D part is to be formed, the delivery piston 26 may be programmed to push a predetermined amount of the build material 12 out of the opening in the supply bed 20 and the fabrication piston 28 may be programmed to move in the opposite direction of the delivery piston 26 in order to increase the depth of the fabrication bed 22. The delivery piston 26 will advance enough so that when the spreader 24 pushes the build material 12 into the fabrication bed 22 and onto the build surface 18 or the previously formed layer, the depth of the fabrication bed 22 is sufficient so that a composite layer 34 of the build material 12 and the liquid functional agent 14 may be formed in the fabrication bed 22. The spreader 24 is capable of spreading the build material 12 into the fabrication bed 22 to form a build material layer, which is relatively uniform in thickness. In an example, the thickness of the build material layer ranges from about 30 µm to about 70 µm, although thinner or thicker layers may also be used. For example, the thickness of the layer 34 may range from about 50 µm to about 1000 µm. Depending upon the desired thickness for the layer 34 and the particle size of the build material 12, the layer 34 that is formed in a single build material application may be made up of a single row of build material particles or several rows of build material particles (as shown at reference numeral 102).

It is to be understood that the spreader 24 may be replaced by other tools, such as a blade that may be useful for spreading different types of powders, or a combination of a roller and a blade.

The supply bed 20 that is shown is one example, and could be replaced with another suitable delivery system to supply the build material 12 to the fabrication bed 22. Examples of other suitable delivery systems include a hopper, an auger conveyer, or the like.

The fabrication bed 22 that is shown is also one example, and could be replaced with another support member, such as a platen, a print bed, a glass plate, or another build surface.

In one example of the method, after the build material 12 is applied, as shown in FIG. 1 at reference numeral 104, the liquid functional agent 14 may be selectively applied to the build material 12, as shown at reference number 106. As illustrated at reference numeral 106, the liquid functional agent 14 may be selectively applied to the build material 12 by the inkjet printhead 16.

When the liquid functional agent 14 is applied on the build material 12, it is to be understood that the liquid functional agent 14 may reside at the top of the layer 34, may completely saturate the layer 34, or may partially penetrate the layer 34. The level of saturation/penetration may depend, at least in part, on the layer thickness, the particle size of the build material 12 particles, and the volume of the liquid functional agent 14 that is applied.

It is to be understood that when the same liquid functional agent 14 is applied both below and on the build material 12, it may be applied in the same pattern or in a different pattern. When multiple liquid functional agents 14 are used, they may be applied in the same pattern or different patterns, which may be above and/or below the build material 12.

It is also to be understood that in some examples of the method 100, the liquid functional agent 14 is applied before the build material 12 is applied (and thus penetrates a lower portion of the applied build material 12) and is not applied after the build material 12 is applied (i.e., is not applied on the build material 12). In these examples, the method 100 proceeds from reference numeral 104 to either reference numeral 108 or reference numeral 110.

In some examples of the 3D printing method, the composite layer 34 is exposed to an oxidizer (not shown). As previously described, the oxidizer may be used when particular reactants are used which participate in an exothermic reaction. Exposing the composite layer 34 to the oxidizer may initiate the reaction involving the energy source material when the energy source material is the reactant fuel. The reaction may be initiated by exposing the composite layer 34 (which includes the energy source material) to the oxidizer alone or exposing the composite layer 34 (which includes the energy source material) to both the oxidizer and energy.

The composite layer 34 may be exposed to the oxidizer by introducing the oxidizer through an environment in which the reaction takes place. For example, the oxidizer may be oxygen gas or nitrogen oxide ($N_2O$, NO, $NO_2$) gases in the environment around the fabrication bed 22.

Alternatively, the composite layer 34 may be exposed to the oxidizer by selectively applying a second liquid functional agent (not shown), including an oxidizer, to the composite layer 34. The second liquid functional agent may be applied on all or less than all of the same portion(s) 30 of the build material 12 in contact the liquid functional agent 14 having the energy source material therein. In this example, the second liquid functional agent may be applied on the portion(s) of the composite layer 34 where it is desirable for the exothermic reaction to take place.

In an example, the second liquid functional agent may be an oxidizer that is jettable without a liquid vehicle. Examples of oxidizers that are jettable without a liquid vehicle include $HNO_3$, $H_2O_2$, $HClO_4$ and other liquid oxidizers that may be jetted without a vehicle in concentrated state. In another example, the oxidizer may be a liquid dissolved in a vehicle. Examples of solid state oxidizers dissolved in liquid vehicle include ammonium nitrate, ammonium perchlorate, potassium permanganate, potassium perchlorate. Examples of liquid oxidizers which can be delivered with or w/o another liquid vehicle include red fuming nitric acid, high concentration hydrogen peroxide (e.g. greater than 30 wt % solution in water), perchloric acid, nitrogen tetroxide (NTO), and nitric acid. In still another example, the oxidizer may be suspended in the liquid vehicle (e.g., a non-polar liquid).

The liquid oxidizer may be present in the second liquid functional agent in an amount ranging from greater than 0 wt % to about 100 wt % of a total weight percent of the second liquid functional agent. The solid state oxidizer may be present in the second liquid functional agent in an amount ranging from greater than 0 wt % to about 80 wt % of a total weight percent of the second liquid functional agent. In one example, the amount of the solid state oxidizer is present in an amount ranging from greater than 0 wt % to about 60 wt %. When the second liquid functional agent includes a liquid vehicle in addition to the oxidizer, the liquid vehicle may include similar components to the liquid vehicle of the liquid functional agent 14 (e.g., co-solvent(s), surfactant(s), dispersing agent(s), water or master solvent, etc.).

The second liquid functional agent may be dispensed from an inkjet applicator, such as an inkjet printhead. The printhead may be any of the printheads described above in relation to the printhead(s) 16 (which is used to apply the liquid functional agent 14 at reference numerals 102 and/or 106 in FIG. 1). The printhead used to dispense the second liquid functional agent may also function (e.g., move, receive commands from the central processing unit, etc.) and have the same dimensions (e.g., length and width) as the printhead(s) 16 described above. The liquid functional agent 14 and the second liquid functional agent may be applied in a single pass or sequentially.

After the liquid functional agent 14 is selectively applied below, on, or below and on the build material 12, and, in some instances, after the composite layer 34 is exposed to an oxidizer, the composite layer 34 is exposed to energy. Energy exposure is shown at reference numerals 108 and 110.

As shown in FIG. 1 at reference numeral 108, the entire layer of the build material 12 (which includes the composite layer 34 as well as unpatterned build material 12) may be exposed to a spatially broad energy source 36. The spatially broad energy source 36 may be a thermal heat source or an electromagnetic radiation source. Examples of suitable spatially broad energy sources 36 include ovens, conventional furnaces, IR lamps, UV lamps, or planar microwave emitters.

Some examples of the spatially broad energy source 36 may be attached, for example, to a carriage that also holds the inkjet printhead(s) 16. The carriage may move the spatially broad source 36 into a position that is adjacent to the fabrication bed 22. The spatially broad energy source 36 may also be fixed above the fabrication bed 22. Other examples of the spatially broad energy source 36 may require that the entire layer of the build material 12 (which includes the composite layer 34 as well as unpatterned build material 12) be removed from the fabrication bed 22 and positioned within the source 36.

As shown in FIG. 1 at reference numeral 110, the energy source may be a tightly focused energy source 38 such as a laser, electron beam or microwave tip emitter. As illustrated at reference numeral 110, an energy beam 42 may be applied using a tightly focused energy source 38 and scanner system 40. The scanning system 40 allows the energy beam 42 to be selectively applied to the composite layer 34 and/or unpatterned portions 32 of the build material 12. While a single tightly focused energy source 38 is shown at reference numeral 110, it is to be understood that multiple tightly focused energy sources 38 may be used.

The tightly focused energy source 38 and the scanning system 40 may be attached to a moving XY stage or a translational carriage (neither of which is shown) that moves them adjacent to the fabrication bed 22 in order to direct the energy beam 42 in desirable area(s). In other examples, the tightly focused energy source 38 and the scanning system 40 may be fixed while a support member (similar to the fabrication bed 22) is configured to move relative thereto.

The spatially broad energy source 36 or the tightly focused energy source 38 and the scanning system 40 may be programmed to receive commands from the central processing unit and to expose the composite layer 34 (including the liquid functional agent(s) 14 and the build material 12) and/or unpatterned portions 32 of the build material 12 to energy.

The energy exposure time may be dependent on the characteristics of the energy source chosen, the characteristics of the liquid functional agent(s) 14 used and/or the characteristics of the build material 12.

Exposing the composite layer 34 and/or unpatterned portions 32 of the build material 12 to energy may cause curing (e.g., melting, sintering, binding, fusing, etc.) of the build material particles 12 to take place. The build material 12 may absorb thermal energy or may convert radiation to thermal energy. In some instances, the energy from the source 36, 38 may be sufficient to elevate the temperature of the build material 12 to a temperature below its melting point but suitable to cause softening and bonding. In other instances, the energy from the source 36, 38 may be sufficient to elevate the temperature of the build material 12 above the melting point of the build material 12. In an example, the temperature may be elevated up to or even beyond 50° C. above the build material melting temperature.

The cured 3D part is not shown in FIG. 1 because the portions of the build material 12 that fuse/melts may depend on whether the liquid functional agent 14 includes an energy source material or an energy sink material, whether the spatially broad energy source 36 or the tightly focused energy source 38 is used, and whether the liquid functional agent 14 is deposited below and/or on all or less than all of the build material 12. In some instances, the portions of the build material 12 that fuse/melts may also depend on whether the oxidizer is present to participate in the reaction with the energy source material of the liquid functional agent 14. It is to understood that the oxidizer is considered to be present when it is part of the liquid functional agent 14, when it is applied in the form of a second liquid functional agent, or when it is supplied from the environment.

When an energy source material is included in the liquid functional agent 14, the reaction involving the energy source material is an exothermic reaction that supplies additional heat to the build material 12 that is in contact with the energy source material (i.e., the build material 12 in the composite layer 34). When the liquid functional agent 14 (including the energy source material) is deposited below and/or on all of the build material 12, the oxidizer is present, and the spatially broad energy source 36 is used, all of the build material 12 fuses/melts. In these examples, the exothermic reaction involving the energy source material may provide additional thermal energy needed to allow the build material 12 to fuse/melt. The exothermic reaction may provide additional thermal energy needed to heat (e.g., super heat) the build material 12 to a temperature necessary to achieve the desired cooling rate, microstructure, and physical properties (e.g., structural integrity).

Some examples of the composite layer 34 include all of the build material 12 that is applied in the fabrication bed 22. In some of these examples, the thermal energy provided by the exothermic reaction involving the energy source material is insufficient to fuse/melt the build material 12. In these examples, when the oxidizer is present, and the tightly focused energy source 38 is used, only the build material 12 where the energy is applied fuses/melts. In some other of these examples, the thermal energy provided by the exothermic reaction involving the energy source material is sufficient to fuse/melt the build material 12. In these examples, when the oxidizer is present, and the tightly focused energy source 38 is used, all of the build material 12 may fuse/melt, and those areas where the energy from the source 38 has been applied will be super heated, and thus will have a different cooling rate, microstructure, and physical properties than the fused/melted build material 12 to which energy from the source 38 has not been applied.

Some examples of the composite layer 34 include less than all of the build material 12 that is applied in the fabrication bed 22. In some of these examples, when the liquid functional agent 14 (including the energy source material) is applied on the composite layer 34 and the oxidizer is present, the energy from the source 36, 38 and the additional thermal energy provided by the exothermic reaction allows the composite layer 34 to fuse/melt. In these instances, the unpatterned build material 12 (in portions 32) will not fuse/melt, and the build material 12 that is not exposed to energy from the source 36, 38 will not fuse/melt. As an example of this, when the spatially broad energy source 36 is used, the build material 12 may fuse/melt only where the liquid functional agent 14 (including the energy source material) has been applied (i.e., the composite layer 34) and the oxidizer is present. As another example of this, when the tightly focused energy source 38 is used, the build material 12 may fuse/melt only where both energy and the liquid functional agent 14 (including the energy source material) have been applied and the oxidizer is present.

As mentioned above, some examples of the composite layer 34 include less than all of the build material 12 that is applied in the fabrication bed 22. In some other of these examples, the energy from the source 36, 38 is sufficient to fuse/melt the build material 12, and the thermal energy provided by the exothermic reaction involving the energy source material is insufficient to cause the build material 12 to fuse/melt. The additional thermal energy provided by the exothermic reaction allows the composite layer 34 to reach a higher temperature than the build material 12 that is not in contact with the energy source material so that the composite layer 34 has a different cooling rate, microstructure, and physical properties (e.g., structural integrity) than the unpatterned build material 12 (in portions 32). In these instances, the unpatterned build material 12 (in portions 32) will fuse/melt, the build material 12 that is not exposed to energy from the source 36, 38 will not fuse/melt. As an example of this, when the spatially broad energy source 36 is used, all of the build material 12 may fuse/melt, and those areas where the liquid functional agent 14 (including the energy source material) has been applied (i.e., the composite layer 34) will super heat and thus have a different cooling rate, microstructure, and physical properties than the fused/melted build material 12 that was not in contact with the energy source material. As another example of this, when the tightly focused energy source 38 is used, the build material 12 fuses/melts wherever energy has been applied and will not fuse/melt where energy is not applied, and those areas where both energy and the liquid functional agent 14 (including the energy source material) have been applied (i.e., the composite layer 34) will super heat and thus have a different cooling rate, microstructure, and physical properties than the fused/melted build material 12 that was not in contact with the energy source material.

As mentioned above, some examples of the composite layer 34 include less than all of the build material 12 that is applied in the fabrication bed 22. In some of these examples, the energy from the source 36, 38 alone is sufficient to fuse/melt the build material 12, and the thermal energy provided by the exothermic reaction alone is also sufficient to allow the build material 12 to fuse/melt. In these examples, all of the build material 12 that is exposed to energy from the source 36, 38 will fuse/melt, and all of the patterned build material 12 (in portions 30) will fuse/melt when the oxidizer is present and the reaction is initiated. The unpatterned build material 12 to which energy is not applied will not fuse/melt. The unpatterned build material 12 that is exposed to energy from the source 36, 38, the patterned build material 12 that is not exposed to energy from the source 36, 38 but is exposed to the exothermic reaction, and the patterned build material 12 that is exposed to energy from the source 36, 38 may each reach a different temperature, and therefore, have a different cooling rate, microstructure, and physical properties (e.g., structural integrity). The patterned build material 12 that is exposed to energy from the source 36, 38 will reach a higher temperature than the build material 12 to which energy is not applied as well as the unpatterned build material 12.

In examples where the exothermic reaction supplies a sufficient amount of energy to fuse/melt the build material 12 patterned with the liquid functional agent 14 (including the energy source material), it is to be understood that the exposure to energy (for fusing/melting) comes from the exothermic reaction and not the source 36, 38. When the exothermic reaction does not require an outside energy source to initiate the reaction, the source 36, 38 is not utilized at all in the method.

When an energy sink material is included in the liquid functional agent 14, the reaction involving the energy sink material is an endothermic reaction that consumes energy from the build material 12 that is in contact with the energy sink material (i.e., from the composite layer 34). When the liquid functional agent 14 (including the energy sink material) is deposited below and/or on all of the build material 12 and the spatially broad energy source 36 is used, all of the build material 12 fuses/melts. When the liquid functional agent 14 (including the energy sink material) is deposited below and/or on all of the build material 12 and the tightly focused energy source 38 is used, only the build material 12 where the energy is applied fuses. In these examples, the energy supplied from the source 36, 38 is sufficient to fuse/melt the build material 12 even after the endothermic reaction has consumed some of the thermal energy. The endothermic reaction involving the energy sink material may affect the cooling rate, and therefore, the microstructure and physical properties (e.g., structural integrity) of the 3D printed part. Additionally, the endothermic reaction involving the energy sink material may remove excess heat from the build material 12 and reduce the thermal stress on the 3D printed part.

Some examples of the composite layer 34 include less than all of the build material 12 that is applied in the fabrication bed 22. In some of these examples, when the liquid functional agent 14 (including the energy sink material) is applied on the composite layer 34, the thermal energy consumed by the endothermic reaction renders the energy from the source 36, 38 insufficient to fuse/melt the composite layer 34. In these instances, the unpatterned build material 12 (in portions 32) will fuse/melt. As an example of this, when the spatially broad energy source 36 is used, the build material 12 may fuse/melt only where the liquid functional agent 14 (including the energy source material) is not applied (i.e., outside the composite layer 34). As another example of this, when the tightly focused energy source 38 is used, the build material 12 may fuse/melt only where energy has been applied and the liquid functional agent 14 (including the energy sink material) has not been applied.

As mentioned above, some examples of the composite layer 34 include less than all of the build material 12 that is applied in the fabrication bed 22. In some other of these examples, the energy supplied from the source 36, 38 is sufficient to fuse/melt the build material 12 even after the endothermic reaction has consumed some of the thermal energy, and as such, the unpatterned build material 12 (in portions 32) reaches a higher temperature than the composite layer 34 so that the unpatterned build material 12 has a different cooling rate, microstructure, and physical properties (e.g., structural integrity) than the composite layer 34. In these instances, the composite layer 34 will fuse/melt. As an example of this, when the spatially broad energy source 36 is used, all of the build material 12 may fuse/melt, and those areas where the liquid functional agent 14 (including the energy sink material) has not been applied (i.e., the composite layer 34) will have a different cooling rate, microstructure, and physical properties than the fused/melted build material 12 that was in contact with the energy sink material. As another example of this, when the tightly focused energy source 38 is used, the build material 12 fuses/melts wherever energy has been applied and will not fuse/melt where energy is not applied, and those areas where energy has been applied and the liquid functional agent 14 (including the energy source material) has not been applied (i.e., the composite layer 34) will have a different cooling rate, microstructure, and physical properties than the fused/melted build material 12 that was in contact with the energy sink material.

In the examples of the method 100 disclosed herein, exposing the composite layer 34 to energy may initiate the reaction involving the energy source material or the energy sink material. Alternatively, the reaction may be initiated by exposing the composite layer 34 to an oxidizer or by exposing the composite layer 34 to both an oxidizer and energy.

The exothermic reaction involving the energy source material may be an oxidation reaction that generates a gaseous byproduct. For example, when the energy source material is fully nitrated nitrocellulose, a reactant including the fuel and the oxidizer, exposure to energy may initiate the following reaction (I):

$$2C_6H_7N_3O_{11} + 9/2 O_2 \rightarrow 12CO_{2\,(g)} + 3N_{2\,(g)} + 7H_2O_{(g)} \tag{I}$$

to produce gaseous carbon dioxide and nitrogen and water vapor. The enthalpy of reaction for reaction (I) is −11 kJ/g.

In another example, if the energy source material is sucrose, as the reactant fuel, exposure to oxygen and energy will initiate the following reaction (II):

$$C_{12}H_{22}O_{11} + 12O_{2\,(g)} \rightarrow 11H_2O_{(g)} + 12CO_{2\,(g)} \tag{II}$$

to produce gaseous carbon dioxide and water vaper. The enthalpy of reaction for reaction (II) is −16.5 kJ/g.

In still another example, if the energy source material is hydrazine, as the reactant fuel, exposure to nitric acid will initiate the following reaction (III):

$$5N_2H_4 + 4HNO_3 \rightarrow 12H_2O_{(g)} + 7N_{2\,(g)} \tag{III}$$

to produce gaseous nitrogen and water vaper.

The endothermic reaction involving the energy sink material may be a decomposition reaction that generates a gaseous byproduct alone or with smaller fragments. For example, when the energy sink material is urea, exposure to energy will initiate the following reaction (IV):

$$NH_2CONH_2 \rightarrow NH_4NCO \rightarrow HNCO + NH_3 \tag{IV}$$

As previously described, the endothermic reaction involving the energy sink material may be a physical reaction in which the energy sink material phase changes from a liquid to a gas or a solid to a gas.

The liquid functional agent(s) 14 and the amounts of those liquid functional agent(s) 14 jetted into each voxel determine the reactions that will occur in each voxel. The chemical reactions that occur in each voxel determine the heating and cooling rates of each voxel, which in turn determines the physical properties of the 3D part.

In the example of the 3D printing method shown in FIG. 1, additional layers of the 3D part may be formed by repeating reference numerals 102-106 and 108 or 110; 102, 104 and 108 or 110; or 102, 106 and 108 or 110. For example, to form an additional layer of the 3D part, the liquid functional agent 14 may be selectively applied to the previously formed layer, an additional layer of the build material 12 may be applied to the previously formed layer to form an additional composite layer, the liquid functional agent 14 may be selectively applied to the additional composite layer, and the additional composite layer may be exposed to energy to form that additional layer. In other examples, additional layers may be formed by depositing the liquid functional agent 14 only below or only on the additional layer of the build material 12 to form the additional composite layer. Any number of additional layers may be formed.

Figure 2:
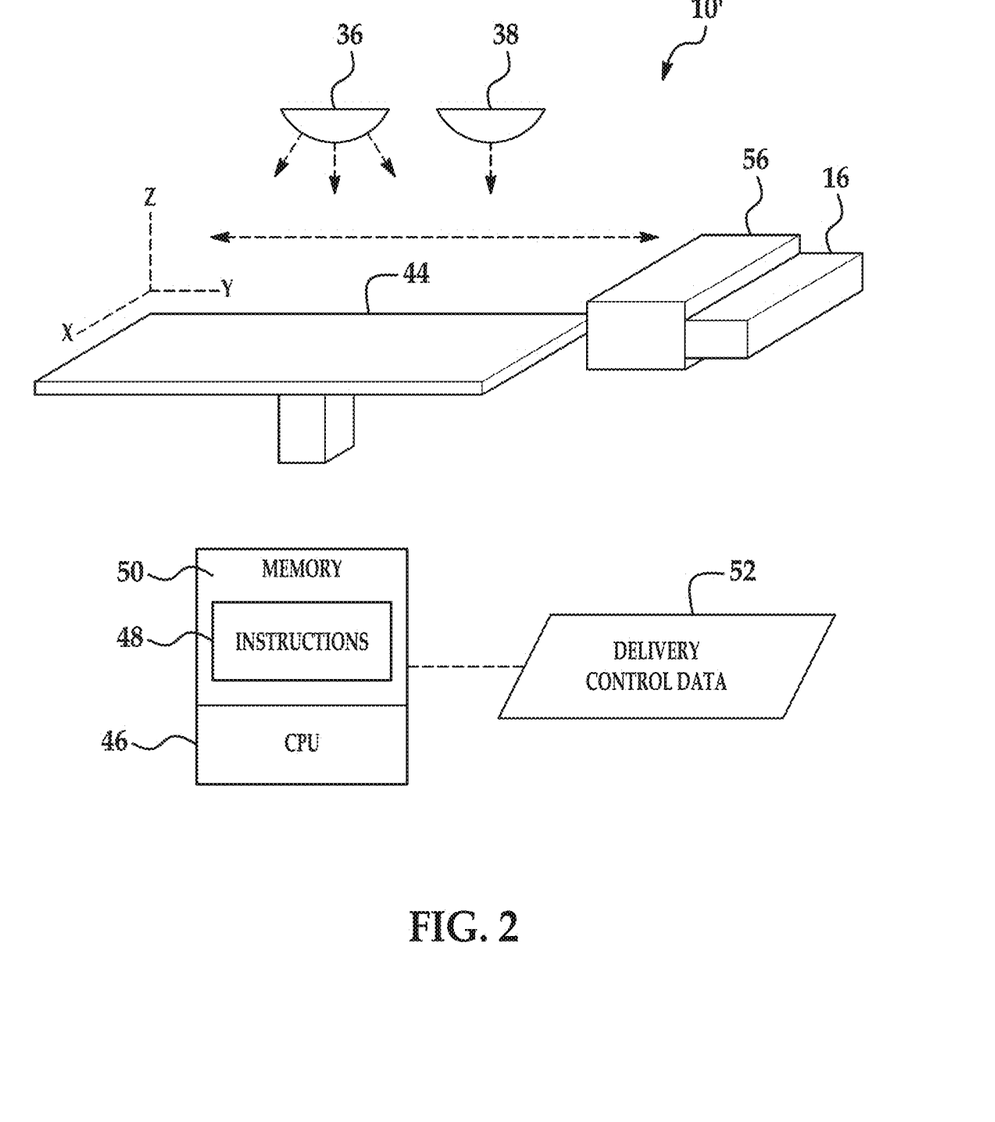
FIG. 2 is a simplified schematic isometric view of an example of a 3D printing system disclosed herein.

Referring now to FIG. 2, another example of the printing system 10' is depicted. The system 10' includes a central processing unit 46 that controls the general operation of the additive printing system 10'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10' in accordance with the instructions 48. For example, the instructions 48 may cause the controller to utilize a liquid functional agent distributor 16 (e.g., an inkjet applicator 16) to selectively dispense the liquid functional agent 14, and to utilize a build material distributor 56 to dispense the build material 12 to form a three-dimensional part.

In this example, the printing system 10' includes a liquid functional agent distributor 16 to selectively deliver the liquid functional agent 14 to portion(s) 30 below and/or on the layer (not shown in this figure) of build material 12 provided on a support member 44.

The central processing unit 46 controls the selective delivery of the liquid functional agent 14 to the layer of the build material 12 in accordance with delivery control data 52.

In the example shown in FIG. 2, it is to be understood that the distributor 16 is a printhead(s), such as a thermal inkjet printhead(s) or a piezoelectric inkjet printhead(s). The printhead(s) 16 may be a drop-on-demand printhead(s) or a continuous drop printhead(s).

The printhead(s) 16 may be used to selectively deliver the liquid functional agent 14, when in the form of a suitable fluid. As described above, the liquid functional agent 14 includes a non-aqueous vehicle or an aqueous vehicle, such as water, co-solvent(s), surfactant(s), etc., to enable it to be delivered via the printhead(s) 16. The liquid functional agent 14 may be selectively dispensed before, after, or both before and after the build material 12 to pattern the build material 12 and form a composite layer 34.

In one example, the printhead(s) 16 may be selected to deliver drops of the liquid functional agent 14 at a resolution ranging from about 300 dots per inch (DPI) to about 1200 DPI. In other examples, the printhead(s) 16 may be selected to be able to deliver drops of the liquid functional agent 14 at a higher or lower resolution. The drop velocity may range from about 5 m/s to about 24 m/s and the firing frequency may range from about 1 kHz to about 100 kHz.

The printhead(s) 16 may include an array of nozzles through which the printhead(s) 16 is able to selectively eject drops of fluid. In one example, each drop may be in the order of about 5 ng per drop, although it is contemplated that a higher (e.g., 100 ng) or lower (e.g., 1 ng) drop size may be used. In some examples, printhead(s) 16 is able to deliver variable size drops.

The printhead(s) 16 may be an integral part of the printing system 10', or it may be user replaceable. When the printhead(s) 16 is user replaceable, they may be removably insertable into a suitable distributor receiver or interface module (not shown).

As shown in FIG. 2, the distributor 16 may have a length that enables it to span the whole width of the support member 44 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 44. In other examples of the printing system 10', the distributor 16 may have a shorter length that does not enable it to span the whole width of the support member 44.

While not shown in FIG. 2, it is to be understood that the distributor 16 may be mounted on a moveable carriage to enable it to move bi-directionally across the length of the support member 44 along the illustrated y-axis. This enables selective delivery of the liquid functional agent 14 across the whole width and length of the support member 44 in a single pass. In other examples, the distributor 16 may be fixed while the support member 44 is configured to move relative thereto.

As used herein, the term 'width' generally denotes the shortest dimension in the plane parallel to the X and Y axes shown in FIG. 2, and the term 'length' denotes the longest dimension in this plane. However, it is to be understood that in other examples the term 'width' may be interchangeable with the term 'length'. As an example, the distributor 16 may have a length that enables it to span the whole length of the support member 44 while the moveable carriage may move bi-directionally across the width of the support member 44.

In examples in which the distributor 16 has a shorter length that does not enable it to span the whole width of the support member 44, the distributor 16 may also be movable bi-directionally across the width of the support member 44 in the illustrated X axis. This configuration enables selective delivery of the liquid functional agent 14 across the whole width and length of the support member 44 using multiple passes.

The distributor 16 may include therein a supply of the liquid functional agent 14 or may be operatively connected to a separate supply of the liquid functional agent 14.

As shown in FIG. 2, the printing system 10' also includes a build material distributor 56. This distributor 56 is used to provide the layer of the build material 12 on the support member 44. Suitable build material distributors 56 may include, for example, any spreader, such as a wiper blade, a roller, or combinations thereof.

The build material 12 may be supplied to the build material distributor 56 from a hopper or other suitable delivery system. In the example shown, the build material distributor 56 moves across the length (Y axis) of the support member 44 to deposit a layer of the build material 12. As previously described, a first layer of build material 12 will be deposited on the support member 44, whereas subsequent layers of the build material 12 will be deposited on a previously deposited (and solidified) layer.

It is to be further understood that the support member 44 may also be moveable along the Z axis. In an example, the support member 44 is moved in the Z direction such that as new layers of build material 12 are deposited, a predetermined gap is maintained between the surface of the most recently formed layer and the lower surface of the distributor 16. In other examples, however, the support member 44 may be fixed along the Z axis and the distributor 16 may be movable along the Z axis.

Similar to the system 10 (shown in FIG. 1), the system 10' also includes the spatially broad energy source 36 and/or the tightly focused energy source 38 to apply energy to the deposited layer of build material 12 and the liquid functional agent 14 to cause the solidification of portion(s) of the build material 12. Any of the previously described spatially broad energy sources 36 or tightly focused energy sources 38 may be used.

While not shown, it is to be understood that the spatially broad energy source 36 and/or the tightly focused energy source 38 may be mounted on the moveable carriage or may be in a fixed position.

The central processing unit 46 may control the spatially broad energy source 36 and/or the tightly focused energy source 38. The amount of energy applied may be in accordance with delivery control data 52.

The system 10' also includes an initiator to initiate the reaction involving i) the energy source material or ii) the energy sink material to alter a thermal condition of the composite layer 34. The initiator may be the oxidizer, energy from the source 36, 38, or both the oxidizer and energy from the source 36, 38. The oxidizer may be in the ambient environment around the system 10' or the oxidizer may be contained in a second liquid functional agent applied by a second liquid functional agent distributor (not shown). The energy may be from the spatially broad energy source 36 or the tightly focused energy source 38.

To further illustrate the present disclosure, an example is given herein. It is to be understood that this example is provided for illustrative purposes and is not to be construed as limiting the scope of the present disclosure.

EXAMPLE

An example of the liquid functional agent was prepared. The energy source material used in the example of the liquid functional agent was sucrose. The formulation of the liquid functional material is provided in the following table:

| Components | Actives wt % | Target wt % | Formulation wt % |
|---|---|---|---|
| 2-Pyrrolidone | 100.00% | 17.00% | 17.00% |
| Sucrose | 100.00% | 30.00% | 30.00% |
| Acticide M20 (Stock Solution) | 10.00% | 0.01% | 0.10% |
| Tergitol 15-S-7 | 90.00% | 0.50% | 0.56% |
| Water | | | 52.34% |
| Total | | | 100.00% |

The liquid functional agent was dispensed using a pipette into a tungsten crucible containing approximately 6 g of −325 mesh $Fe_3O_4$ powder sourced from Alfa Aesar (Ward Hill, Mass.).

Figure 3A:
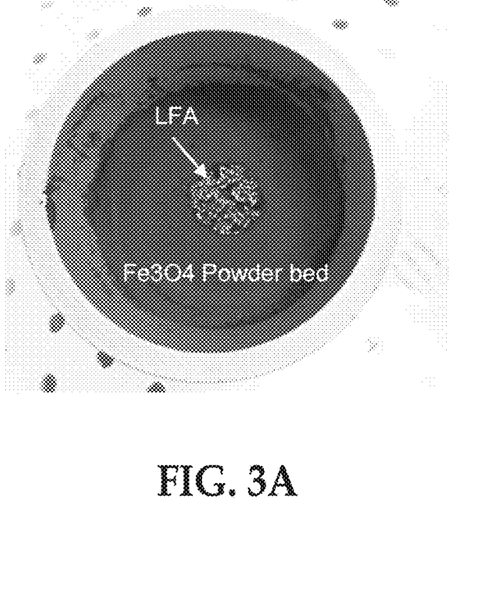
FIG. 3A is a black and white representation of an originally colored photographic image of an example liquid functional agent (LFA) and an example build material prior to initiating the reaction involving an example heat source material.

The liquid vehicle of the liquid functional agent was removed by baking the crucible containing the $Fe_3O_4$ powder and the liquid functional agent on a hotplate for 12 hours at 110° C. in an argon environment. About 50 mg of sucrose remained in the powder bed after the liquid vehicle was removed. A black and white photographic image of the crucible containing the $Fe_3O_4$ powder and the sucrose thereon after baking on the hotplate is shown FIG. 3A.

Figure 3B:
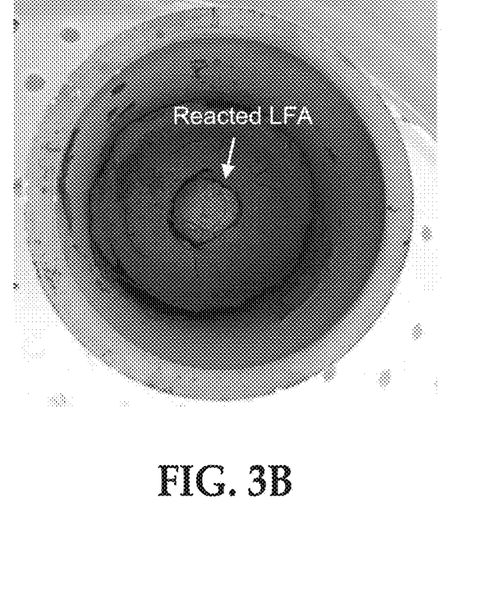
FIG. 3B is a black and white representation of an originally colored photographic image of an example part after initiating the reaction involving the example heat source material.

The crucible containing the $Fe_3O_4$ powder and the sucrose thereon was then placed in a furnace box at 1000° C. for 10 minutes. The environment in the furnace box contained oxygen. The crucible was removed from the furnace box and allowed to air cool. The portions of the $Fe_3O_4$ powder with liquid functional agent thereon reacted to the heat treatment in the furnace box differently and have a different visual appearance than the $Fe_3O_4$ powder without liquid functional agent thereon. A black and white photographic image of the crucible after it was removed from the furnace box is shown in FIG. 3B.

Figure 4A:
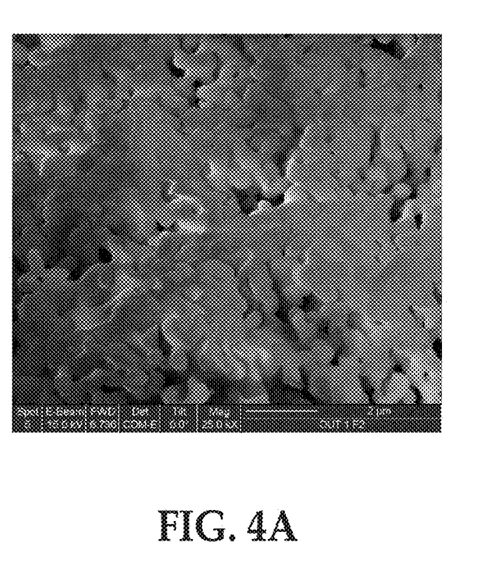
FIG. 4A is a scanning electron microscope ("SEM") image, using a scalar bar of 2 µm, of an area of an example part that was not treated with an example liquid functional agent.

A SEM image was taken of part of the region that was not treated with the liquid functional agent. This is shown in FIG. 4A. The SEM image in FIG. 4A shows that the $Fe_3O_4$ powder particles have been sintered together, but not fully melted.

Figure 4B:
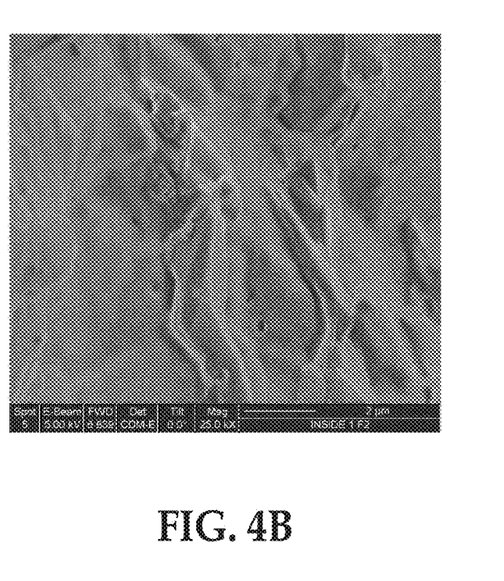
FIG. 4B is a SEM image, using a scalar bar of 2 µm, of an area of an example part that was treated with an example liquid functional agent.

A SEM image was also taken of part of the region that was treated with the liquid functional agent. This is shown in FIG. 4B. The SEM image in FIG. 4B shows that the $Fe_3O_4$ powder particles have melted and solidified. The melting temperature $Fe_3O_4$ is approximately 1580° C. Therefore, this example illustrates that the exothermic reaction of the sucrose in the liquid functional agent provided additional energy to allow the $Fe_3O_4$ to melt in the treated zone.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 1 μm and up to about 500 μm should be interpreted to include the explicitly recited limits of greater than 1 μm to 500 μm, as well as individual values, such as 50 μm, 125 μm, 300.5 μm, 495 μm, etc., and sub-ranges, such as from about 35 μm to about 375 μm, from about 60 μm to about 225 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
    a) selectively applying, from a thermal inkjet printhead or a piezoelectric inkjet printhead, a liquid functional agent including [[i)]] an energy source material;
    b) applying a metallic or ceramic build material, wherein the liquid functional agent is selectively applied any of before the metallic or ceramic build material, after the metallic or ceramic build material, or both before and after the metallic or ceramic build material, and wherein the liquid functional agent patterns the metallic or ceramic build material to form a composite layer;
    c) exposing at least some of the metallic or ceramic build material to energy;
    d) initiating a reaction involving the energy source material to alter a thermal condition of the composite layer, wherein either d) or both c) and d) fuse the composite layer; and then
    e) repeating a) through d) to form a 3D object;
    wherein:
        the energy source material is selected from the group consisting of organic molecules with nitro ($NO_2$) groups, organic esters of nitric acid, nitrates of mannitol, nitrates of pentaerythritol, and organic salts of nitric, chloric and perchloric acids; or
        the enemy source material is selected from the group consisting of hydrazine, monomethylhydrazine, dimethylhydrazine, aniline, furfuryl alcohol, turpentine, and tetramethylethylenediamine.

2. The method as defined in claim 1 wherein the reaction involving the energy source material is an exothermic reaction that supplies additional energy to the composite layer and generates a gaseous byproduct.

3. The method as defined in claim 2 wherein:
    the energy source material is a reactant including a fuel and an oxidizer, and wherein the initiating of the reaction is accomplished by the exposing of the composite layer to the energy; or
    the energy source material is a reactant fuel, and wherein the initiating of the reaction is accomplished by exposing the composite layer to an oxidizer and by the exposing of the composite layer to the energy.

4. A three-dimensional (3D) printing method, comprising:
a) selectively applying, from a thermal inkjet printhead or a piezoelectric inkjet printhead, a liquid functional agent including an energy source material;
b) applying a metallic or ceramic build material, wherein the liquid functional agent is selectively applied any of before the metallic or ceramic build material, after the metallic or ceramic build material, or both before and after the metallic or ceramic build material, and wherein the liquid functional agent patterns the metallic or ceramic build material to form a composite layer;
c) exposing at least some of the metallic or ceramic build material to energy;
d) initiating a reaction involving the energy source material to alter a thermal condition of the composite layer, wherein either d) or both c) and d) fuse the composite layer; and then
e) repeating a) through d) to form a 3D object;
wherein the reaction involving the energy source material is an exothermic reaction that supplies additional energy to the composite layer and generates a gaseous byproduct;
wherein the energy source material is a reactant including a fuel and an oxidizer, and wherein the initiating of the reaction is accomplished by the exposing of the composite layer to the energy;
and wherein the reactant is selected from the group consisting of organic molecules with nitro ($NO_2$) groups, organic esters of nitric acid, nitrates of mannitol, nitrates of pentaerythritol, and organic salts of nitric, chloric and perchloric acids.

5. A three-dimensional (3D) printing method, comprising:
a) selectively applying, from a thermal inkjet printhead or a piezoelectric inkjet printhead, a liquid functional agent including an enemy source material;
b) applying a metallic or ceramic build material, wherein the liquid functional agent is selectively applied any of before the metallic or ceramic build material, after the metallic or ceramic build material, or both before and after the metallic or ceramic build material, and wherein the liquid functional agent patterns the metallic or ceramic build material to form a composite layer;
c) exposing at least some of the metallic or ceramic build material to enemy;
d) initiating a reaction involving the energy source material to alter a thermal condition of the composite layer, wherein either d) or both c) and d) fuse the composite layer; and then
e) repeating a) through d) to form a 3D object;
wherein the energy source material is a reactant fuel selected from the group consisting of sugars, sugar alcohols, high boiling aliphatic hydrocarbons, high boiling aromatic hydrocarbons, high boiling alcohols, and organic amines.

6. The method as defined in claim 3, further comprising introducing the oxidizer through an environment in which the reaction takes place.

7. The method as defined in claim 3, further comprising introducing the oxidizer by selectively applying a second liquid functional agent, including the oxidizer, to the composite layer.

8. The method as defined in claim 2 wherein the energy source material is a reactant fuel, and wherein the initiating of the reaction is accomplished by exposing the composite layer to an oxidizer.

9. A three-dimensional (3D) printing method, comprising:
selectively applying a liquid functional agent including an energy source material;
applying a metallic or ceramic build material;
wherein the liquid functional agent is selectively applied any of before the metallic or ceramic build material, after the metallic or ceramic build material, or both before and after the metallic or ceramic build material, and wherein the liquid functional agent patterns the metallic or ceramic build material to form a composite layer;
exposing at least some of the metallic or ceramic build material to energy; and
initiating a reaction involving the energy source material to alter a thermal condition of the composite layer;
wherein the reaction involving the energy source material is an exothermic reaction that supplies additional energy to the composite layer and generates a gaseous byproduct;
wherein the energy source material is a reactant fuel, and wherein the initiating of the reaction is accomplished by exposing the composite layer to an oxidizer;
and wherein the reactant fuel is selected from the group consisting of hydrazine, monomethylhydrazine, dimethylhydrazine, aniline, furfuryl alcohol, turpentine, and tetramethylethylenediamine, and wherein the oxidizer is selected from the group consisting of ammonium nitrate, ammonium perchlorate, potassium permanganate, potassium perchlorate, red fuming nitric acid, high concentration hydrogen peroxide, perchloric acid, nitrogen tetroxide (NTO), and nitric acid.

10. The method as defined in claim 1 wherein the liquid functional agent does not include an energy absorber.

11. The method as defined in claim 5 wherein the organic amine is hexamethylenetetramine.

12. The method as defined in claim 5 wherein the energy source material is selected from the group consisting of sucrose, sorbitol, mannitol, glucose, and fructose.

13. The method as defined in claim 5 wherein the energy source material is sucrose.

14. The method as defined in claim 13 wherein the metallic or ceramic build material is $Fe_3O_4$ powder.

* * * * *